US008694794B2

(12) United States Patent
Ishida et al.

(10) Patent No.: US 8,694,794 B2
(45) Date of Patent: Apr. 8, 2014

(54) METHOD FOR PROTECTING A PRIVILEGE LEVEL OF SYSTEM MANAGEMENT MODE OF A COMPUTER SYSTEM

(75) Inventors: Norihito Ishida, Yokohama (JP);
Toyoaki Inada, Sagamihara (JP);
Eitaroh Kasamatsu, Kawasaki (JP);
Noritoshi Yoshiyama, Yokohama (JP)

(73) Assignee: Lenovo (Singapore) Pte Ltd., Singapore (SG)

( * ) Notice: Subject to any disclaimer, the term of this patent is extended or adjusted under 35 U.S.C. 154(b) by 622 days.

(21) Appl. No.: 12/874,622

(22) Filed: Sep. 2, 2010

(65) Prior Publication Data

US 2011/0078408 A1 Mar. 31, 2011

(30) Foreign Application Priority Data

Sep. 29, 2009 (JP) ................. 2009-223662

(51) Int. Cl.
*G06F 12/08* (2006.01)
*G06F 15/177* (2006.01)

(52) U.S. Cl.
USPC ............. 713/187; 713/2; 713/189; 713/190; 726/2

(58) Field of Classification Search
USPC .................... 713/2, 187, 189–190; 726/2
See application file for complete search history.

(56) References Cited

U.S. PATENT DOCUMENTS

| 6,557,104 | B2 * | 4/2003 | Vu et al. ................. 713/189 |
| 7,433,985 | B2 * | 10/2008 | Ayyar et al. .............. 710/260 |
| 2001/0056518 | A1 * | 12/2001 | Maeda ..................... 711/103 |
| 2005/0289311 | A1 * | 12/2005 | Durham et al. ........... 711/163 |
| 2007/0016766 | A1 * | 1/2007 | Richmond et al. ........ 713/100 |
| 2009/0172639 | A1 * | 7/2009 | Natu et al. ............... 717/120 |
| 2009/0327684 | A1 * | 12/2009 | Zimmer et al. ............. 713/2 |
| 2010/0262743 | A1 * | 10/2010 | Zimmer et al. .......... 710/267 |

FOREIGN PATENT DOCUMENTS

| JP | 2001-075828 | 3/2001 |
| JP | 2008-500655 | 1/2008 |
| WO | 2006-012341 A1 | 2/2006 |

OTHER PUBLICATIONS

Seshadri et al. "Verifying Code Integrity and Enforceing Untampered Code Execution on Legacy Systems", 2005, Pioneer, 16 Pages.*
IT Innovation and Research "OS Independent Run-Time System Integrity Services", 2005, Intel Corporation, Version 001, 17 Pages.*
Wojtczuk et al., "Attacking SMM Memory via Intel CPU Cache Poisoning"; Invisible Things Lab, http://invisiblethingslab.com (no date).

* cited by examiner

*Primary Examiner* — Saleh Najjar
*Assistant Examiner* — Shiuh-Huei Ku
(74) *Attorney, Agent, or Firm* — Antony P. Ng; Yudell Isidore Ng Russell PLLC

(57) ABSTRACT

A method for protecting a privilege level of a system management mode (SMM) of a computer system is disclosed. A SMM program is loaded into a special memory (SMRAM) area within a system memory of a computer. A first program, a second program, and a vector table are loaded into a general area of the system memory. Before the booting process of the computer has been completed, a reference hash value of the first program is determined by the SMM program, and the reference hash value is stored in the SMRAM area. A hash value of the first program is the computed by the SMM program. After the computer has been operating under an operating environment of an operating system, the computed hash value is compared to the reference hash value. When the computed hash value matches the reference hash value, the first program is called by the SMM program.

13 Claims, 6 Drawing Sheets

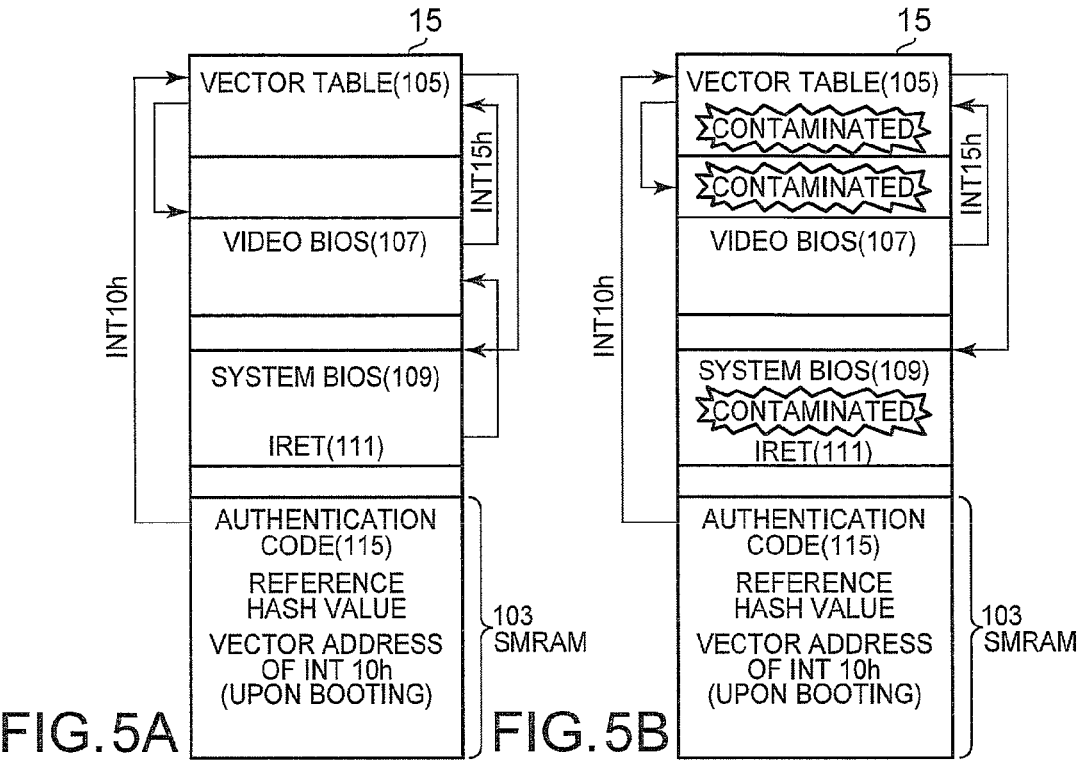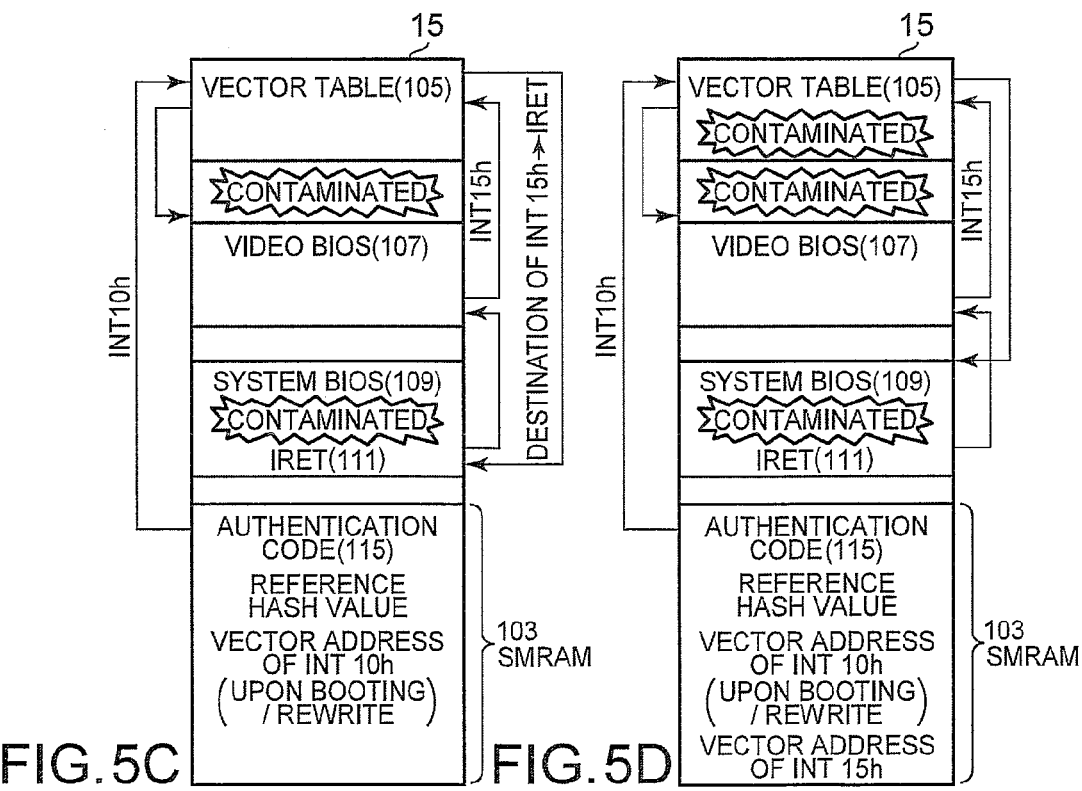

METHOD FOR PROTECTING A PRIVILEGE LEVEL OF SYSTEM MANAGEMENT MODE OF A COMPUTER SYSTEM

PRIORITY CLAIM

The present application claims benefit of priority under 35 U.S.C. §§120, 365 to the previously filed Japanese Patent Application No. JP2009-223662 entitled, "Computer that Protects Privilege Level of System Management Mode" with a priority date of Sep. 29, 2009, which is incorporated by reference herein.

BACKGROUND

1. Technical Field

The present invention relates to operational modes of computer systems in general, and in particular to a method and apparatus for protecting a privilege level of system management mode of a computer system.

2. Description of Related Art

Intel Corporation provides a protection mechanism for the Intel's processor and chipset called Intel Trusted Execution Technology (TXT) that includes enhanced security features for protecting a computer system from a malicious program. TXT employs an operational mode called system management mode (SMM) in Intel's X86 processor series. SMM is intended to provide an operating environment independent of an operating system (OS) for the control of power, temperature, and the like of a computer system.

In a protected mode within an OS operating environment, there are four privilege levels: from ring 0 allowing execution of kernel code to ring 3 allowing execution of user programs. In SMM, on the other hand, a privilege level similar to the privilege level of ring 0 in protected mode in the OS operating environment is provided in an operational mode in which code loaded in a protected special memory area is executed when a system management interrupt (SMI) is asserted. Accordingly, if the privilege level of SMM (hereafter referred to as the SMM privilege) is acquired by a malicious program, the main code of a computer system is rewritten. Since the OS is unable to recognize which program uses the SMM privilege, this poses a serious threat to system security.

SUMMARY

In accordance with a preferred embodiment of the present invention, a system management mode (SMM) program is loaded into a special memory (SMRAM) area within a system memory of a computer. A first program, a second program, and a vector table are loaded into a general area of the system memory. Before the booting process of the computer has been completed, a reference hash value of the first program is determined by the SMM program, and the reference hash value is stored in the SMRAM area. A hash value of the first program is the computed by the SMM program. After the computer has been operating under an operating environment of an operating system, the computed hash value is compared to the reference hash value. When the computed hash value matches the reference hash value, the first program is called by the SMM program.

All features and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein:

FIG. 5 is a diagram showing a state of the main memory; and

DETAILED DESCRIPTION OF A PREFERRED EMBODIMENT

A. Structure of a Computer

Figure 1A:
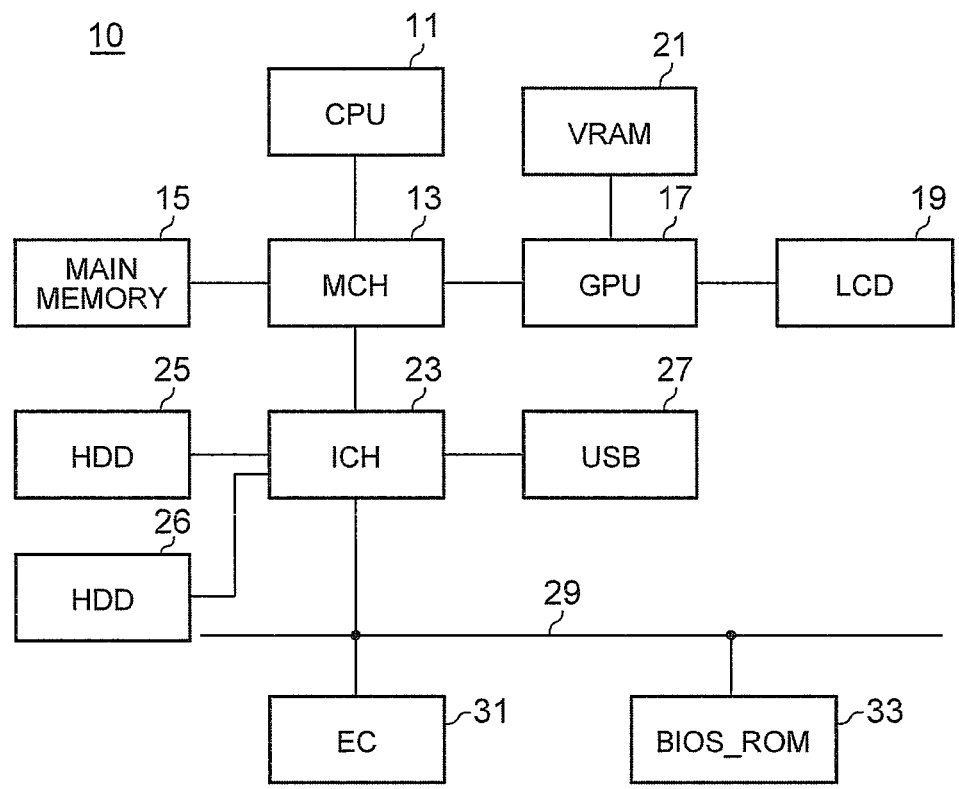
FIGS. 1A and 1B are block diagrams of a computer according to an embodiment of the present invention.
Figure 1B:
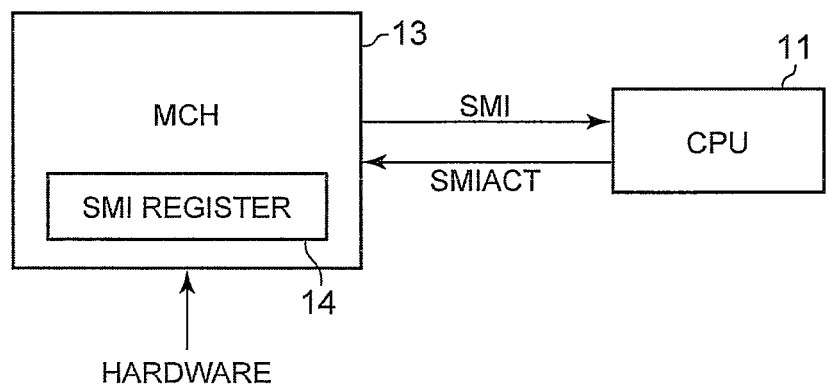

FIGS. 1A and 1B are block diagrams of a computer 10 according to an embodiment of the present invention. FIG. 1A shows an overall structure, and FIG. 1B shows a partial structure relating to a CPU and a SMI. Note that the same elements are given the same reference numerals throughout this specification. A CPU 11 is configured in the X86 architecture of Intel Corporation, and is operable not only in protected mode but also in SMM. A memory controller hub (MCH) 13 is a chipset having a memory controller function of controlling access operations to a main memory 15 and a data buffer function of smoothing out data transfer speed discrepancies between the CPU 11 and other devices. The MCH 13 includes a SMI register 14 for setting a cause of the SMI.

The CPU 11 executes a program or hardware implemented on a motherboard generates an event relating to temperature or power, thereby setting the SMI register 14. The MCH 13 accordingly sends a SMI signal to a SMI pin of the CPU 11 to cause the CPU 11 to operate in SMM. Upon receiving a notification through a SMIACT pin that the CPU 11 operates in SMM, the MCH 13 controls, by hardware, access to the main memory 15 to create a SMM environment. While the CPU 11 is operating in SMM, the MCH 13 protects code loaded in a SMRAM area (FIG. 2) from being rewritten by an OS or an application program. The CPU 11, the main memory 15, a graphics processing unit (GPU) 17, and an I/O controller hub (ICH) 23 are connected to the MCH 13.

The main memory 15 is a volatile RAM used as a read area of a program executed by the CPU 11 and a work area for writing processing data. The SMRAM area which is an area for loading code executed when the CPU 11 operates in SMM is defined in the main memory 15 in addition to a general area. A video memory (VRAM) 21 and a LCD 19 are connected to the GPU 17. The GPU 17 is a special processor for writing an image into the VRAM 21 based on a drawing instruction received from the CPU 11 and sending data of the image to the LCD 19 at a predetermined timing, and is also called a graphics accelerator. The ICH 23 processes data transfers relating to peripheral input/output devices.

The ICH 23 includes ports such as Universal Serial Bus (USB), Serial AT Attachment (ATA), Serial Peripheral Interface (SPI) bus, Peripheral Component Interconnect (PCI) bus, PCI-Express bus, and Low Pin Count (LPC). Hard disk drives (HDD) 25 and 26, a USB controller 27, a LPC bus 29, and the like are connected to the ICH 23. The HDD 25 is a boot disk, and stores a boot image upon startup of the computer 10. The HDD 26 is a secondary drive, and the computer 10 supports a hot attach function of connecting the HDD 26 during operation.

Devices not requiring high-speed data transfer such as an embedded controller 31 and a BIOS_ROM 33 are connected to the LPC bus 29. The BIOS_ROM 33 is a nonvolatile memory capable of electrical rewriting of stored content, and stores device drivers for controlling input/output devices, a system BIOS that complies with the Advanced Configuration and Power Interface (ACPI) specification and manages the power, the temperature in the system enclosure, and the like, a vector table, Power-On Self Test (POST) code for testing and initializing hardware upon startup of the computer 10, authentication code for performing password authentication, and so on.

The system BIOS holds setting information and unique information of the computer 10, and serves to provide the held information when called from another program. A part of the system BIOS is composed of a video BIOS for displaying an image on the LCD 19 while the OS and a video driver are not executed, such as during booting from startup or during resume from suspend. Hardware and software protection is applied to the BIOS_ROM 33 by a well known method, and it is ensured that the code stored in the BIOS_ROM 33 is legitimate.

B. Data Structure of a Main Memory

Figure 2:
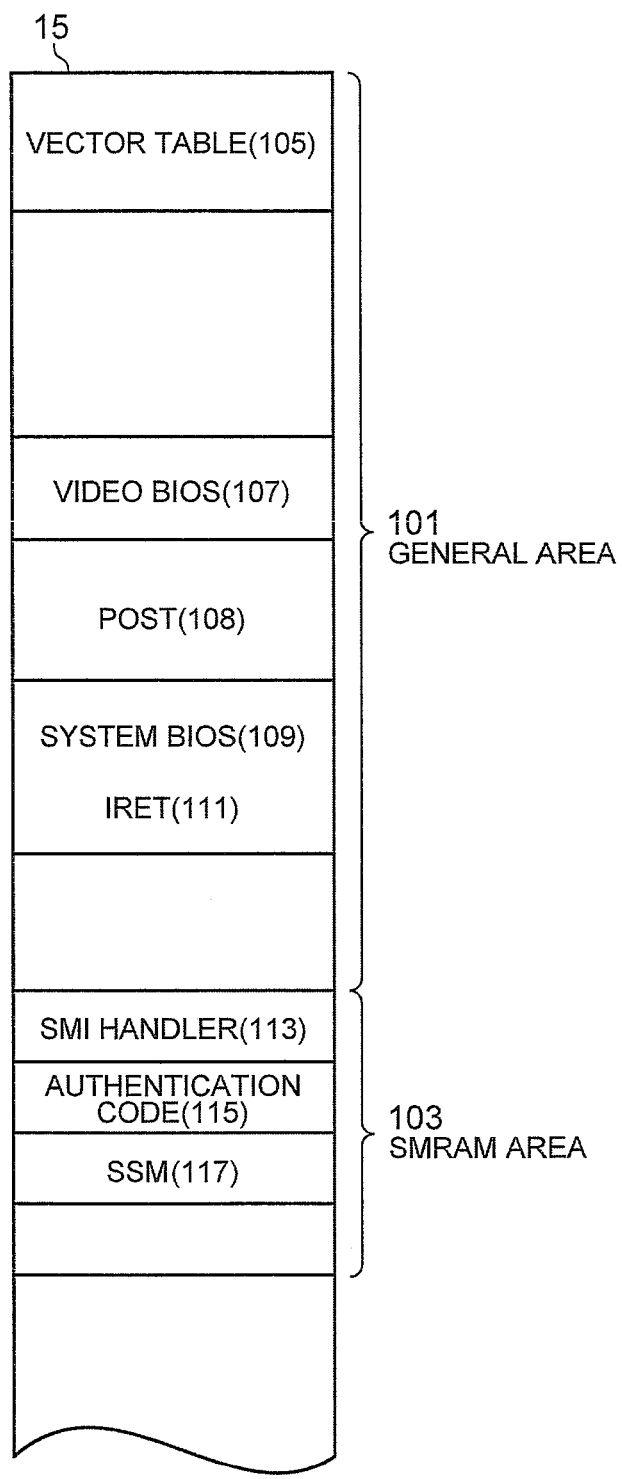
FIG. 2 is a block diagram of a main memory showing a state where programs necessary for the description of the embodiment.

FIG. 2 is a diagram showing a state where the programs and the vector table necessary for the description of this embodiment are loaded in the main memory 15. The general area and the SMRAM area are defined in the main memory 15. Programs stored in the BIOS_ROM 33, the operating system (OS) stored in the HDD 25, device drivers, application programs, and the like are loaded in a general area 101. The area of the main memory 15 in which the programs stored in the BIOS_ROM 33 are loaded is typically write-protected by the MCH 13. This embodiment, however, assumes there is a possibility that a malicious program disables the write protection and contaminates a program or embeds malicious code.

A SMI handler 113 and authentication code 115 are loaded in a SMRAM area 103, and also an area called State Save Map (SSM) is secured in the SMRAM area 103. A vector table 105 contains 256 vector addresses each of which is made up of 4 bytes of a segment address and an offset address. A system BIOS 109 includes an IRET instruction 111 to return to an original routine interrupted by an INT instruction. The IRET instruction 111 is also included in a video BIOS 107 and POST code 108, though it is not necessary for the description of this embodiment and so is omitted in FIG. 2.

The SMI handler 113 is code that is always executed first when the SMI is asserted. When the SMI is asserted, the SMI handler 113 recognizes a cause of the SMI by referencing the SMI register 14 in the MCH 13, and calls a program loaded in the SMRAM area 103 or a program loaded in the general area 101 and causes the CPU 11 to execute the called program. The authentication code 115 is a program for processing authentication by a power-on password or a hard disk password upon computer startup or return from suspend or hibernation. The SSM is an area for storing contexts of registers, pointers, and the like immediately before the CPU 11 switches to SMM.

Figure 6:
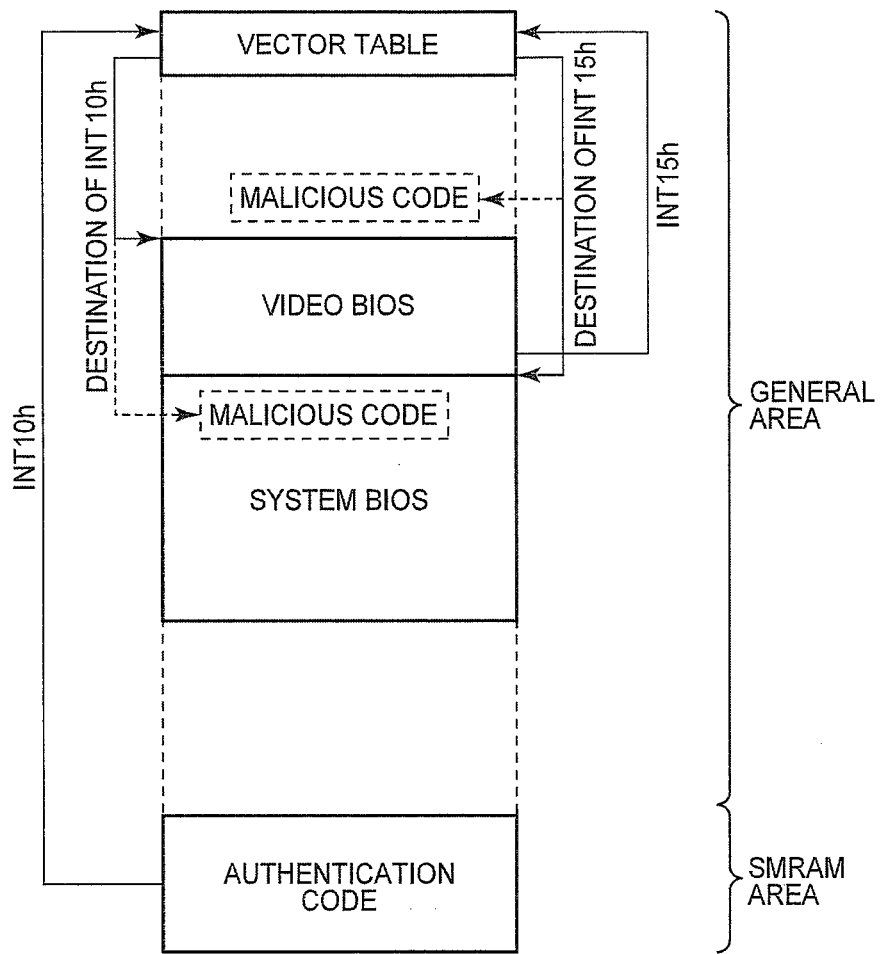
FIG. 6 is a diagram illustrating an expected attack scenario for the SMM privilege.

The code stored in the BIOS_ROM 33 is ensured as legitimate. Accordingly, only a legitimate program runs while the computer 10 is powered on and the main memory 15 is loaded, before control transfers to the OS. Hence, it is impossible for the malicious program to govern the SMM privilege by the method as shown in FIG. 6. However, while the OS runs, there is a possibility that the malicious program enters into the computer 10 through a network or external storage media and governs the SMM privilege by rewriting a program loaded in the general area 101 or embedding malicious code.

C. Method for Protecting the SMM Privilege

Figure 3:
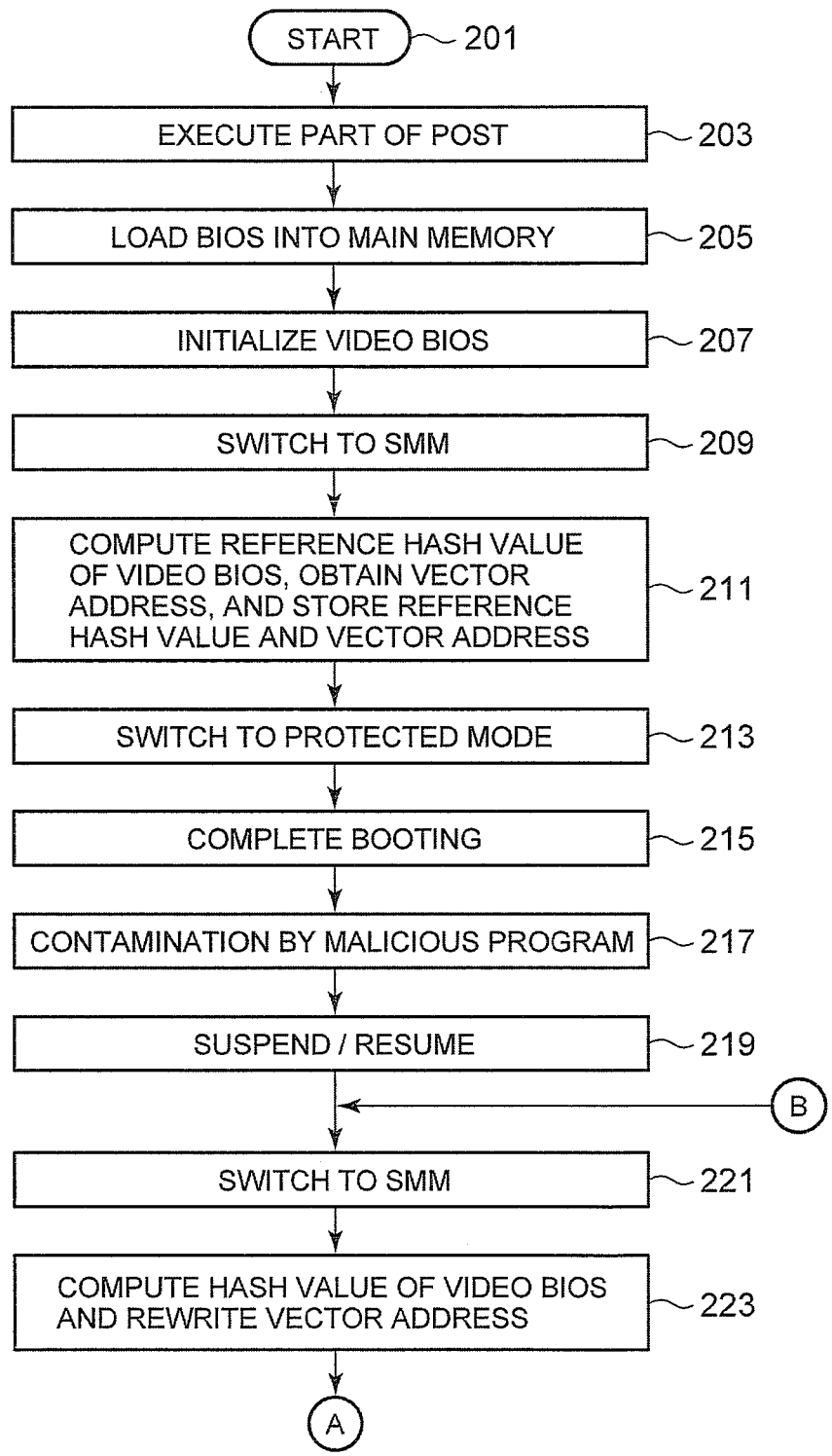
FIG. 3 is a flowchart showing a method for protecting the SMM privilege.
Figure 4:
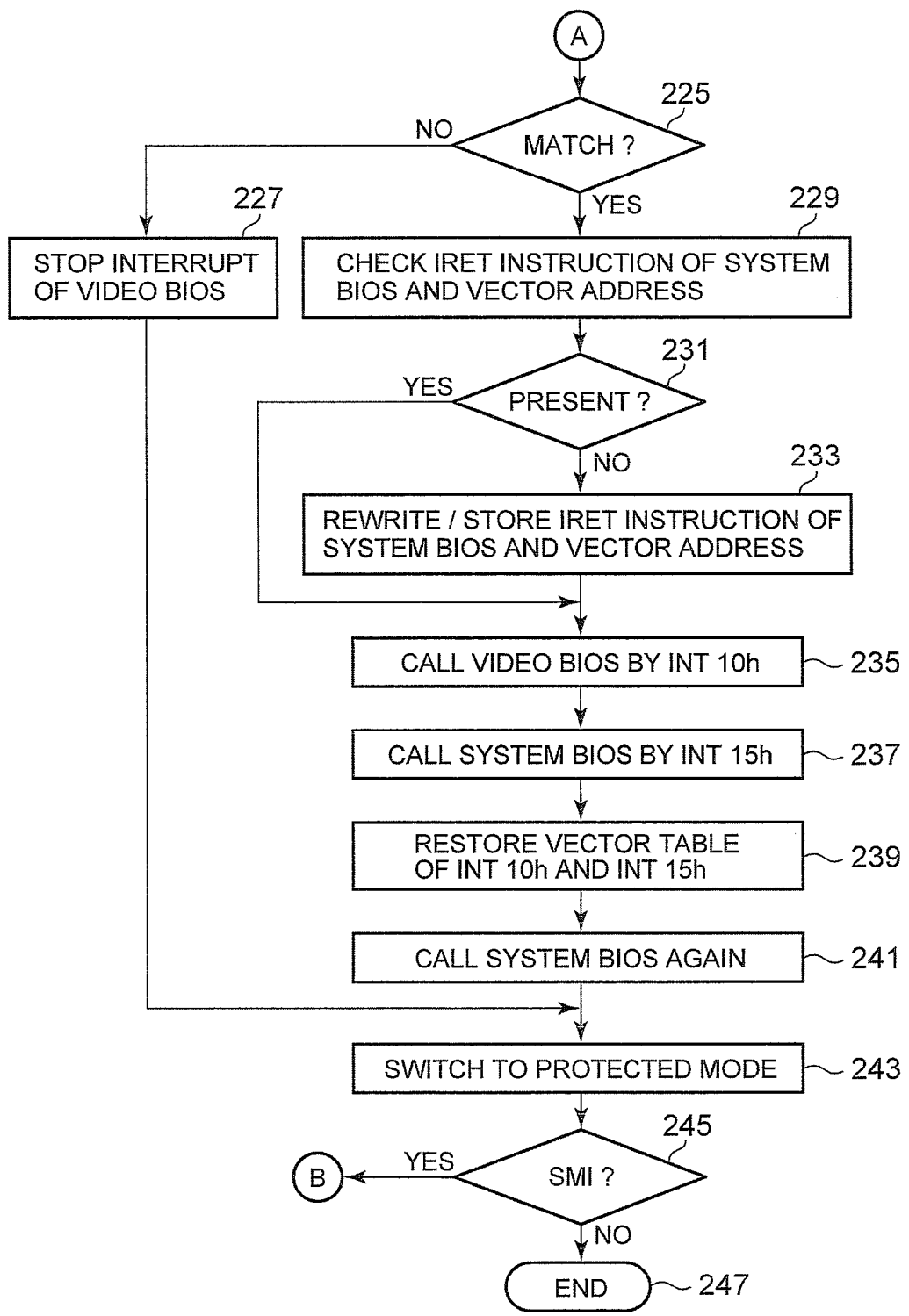
FIG. 4 is a flowchart showing a method for protecting the SMM privilege.

A method for protecting the SMM privilege is described below, with reference to the flowcharts of FIGS. 3 and 4 and the main memory state diagram of FIG. 5. When the computer 10 is powered on in block 201, the CPU 11 first accesses a predetermined address in the BIOS_ROM 33 and executes the POST code 108 to start booting in block 203. Though the POST code 108 is executed in protected mode, the SMI is asserted according to need during booting to cause the CPU 11 to operate in SMM. The POST code 108 tests and initializes registers in the CPU 11, the MCH 13, the main memory 15, and the like in an early stage and, once the main memory 15 has become usable, loads the programs and the vector table 105 stored in the BIOS_ROM 33 into the main memory 15 in block 205, as shown in FIG. 2.

In block 207, the video BIOS 107 tests and initializes the GPU 17, the VRAM 21, and the LCD 19. During the testing and the initialization by the video BIOS 107, the contents of code of the video BIOS 107 change from the state upon loading, as a result of erasing data used for initialization or holding new data. However, the contents of code no longer change once the initialization has been completed, allowing for legitimacy verification through hash value computation.

In block 209, in order to execute the authentication code 115, the POST code 108 asserts the SMI to switch the operation of the CPU 11 to SMM. When the POST code 108 sets the SMI register 14 in the MCH 13, the MCH 13 sends a SMI signal to the CPU 11. When the SMI is asserted, the CPU 11 stores contexts of registers and pointers at this point into the SSM 117 in the main memory 15, and notifies the MCH 13 through the SMIACT pin that the CPU 11 operates in SMM. When the CPU 11 is operating in SMM, the MCH 13 permits access to an address in the SMRAM area. When the CPU 11 is not operating in SMM, on the other hand, the MCH 13 processes access to an address in the SMRAM area as access to another address in the main memory 15.

Having switched to SMM, the CPU 11 first executes the SMI handler 113 without exception. The SMI handler 113 checks the cause of the SMI by referencing the SMI register 14 in the MCH 13, and executes the authentication code 115 upon detecting that the POST code 108 requests the execution of the authentication code 115. In block 211, the authentication code 115 computes a hash value of the video BIOS 107 the initialization of which has been completed, and stores the hash value in the SMRAM area 103. Up to this point, there is no possibility that the video BIOS 107 is contaminated by the malicious program, and so the legitimacy of the video BIOS 107 is ensured. The hash value of the video BIOS 107 computed here is referred to as a reference hash value.

The authentication code 115 also obtains a vector address corresponding to an interrupt type of INT 10h from the vector table 105, and stores the vector address in the SMRAM area 103. Once the initialization has been completed, there is no possibility that the contents of code of the video BIOS 107 are changed by the video BIOS 107 itself or by a legitimate program. Therefore, by computing a hash value of the video BIOS 107 and comparing it with the reference hash value in subsequent various stages, it is possible to determine in each stage whether or not the video BIOS 107 is contaminated by the malicious program.

Having stored the hash value and the vector address, the authentication code 115 performs password authentication of a power-on password, a hard disk password, a logon password, and the like. Since the vector table 105, the video BIOS 107, and the system BIOS 109 are not contaminated by the malicious program, the authentication code 115 executes an INT 10h instruction to execute the video BIOS 107 from an original entry point, and the video BIOS 107 executes an INT 15h instruction to execute the system BIOS 109 from an original entry point, thereby performing password authentication. At this point, there is no possibility that the SMM privilege is governed by the malicious program.

In block 213, the authentication code 115 executes a Return from System Management (RSM) instruction, and sets the SMI register 14 so that the MCH 13 negates the SMI. The authentication code 115 returns the contexts of the CPU 11 stored in the SSM 117 to the CPU 11, and causes the CPU 11 to switch from SMM to protected mode. Having switched to protected mode, the CPU 11 restarts the execution of the POST code 108 from a state immediately before operating in SMM. FIG. 5A shows a state of the main memory immediately before switching to protected mode. Subsequently, the rest of the POST code 108 is executed to complete the booting.

In block 215, the booting is completed including the loading of the OS, the device drivers, and the application programs, and the computer 10 operates in protected mode to create the OS operating environment. In block 217, it is assumed that, while the computer 10 operates in the OS operating environment, at least one of the vector table 105, the video BIOS 107, and the system BIOS 109 is contaminated by the malicious program. The form of contamination is, for example, that the malicious program hooks the vector table 105 and guides an interrupt destination by the INT instruction to malicious code, or embeds malicious code in the video BIOS 107 or the system BIOS 109. FIG. 5B shows this state.

In this state, when the authentication code 115 calls the video BIOS 107 by the INT 10h instruction or the video BIOS 107 calls the system BIOS 109 by the INT 15h instruction while the CPU 11 operates in SMM, the SMM privilege is governed by malicious code. In block 219, the secondary HDD 26 is hot-attached to the computer 10, and the computer 10 performs, as a normal operation, an operation of returning (resume) immediately after switching to suspend. Since the computer 10 is designed to authenticate a HDD password upon resume, the authentication code 115 needs to call the video BIOS 107. When switching to suspend, power management code stored in the BIOS_ROM 33 sets the pre-switch state in the MCH 13.

Upon resume from suspend, the storage of the programs and the vector tables 105 loaded in the main memory 15 as shown in FIG. 2 is maintained, and so there is a possibility that the contamination in block 217 is maintained. Moreover, the GPU 17, the LCD 19, and the VRAM 21 are powered off during suspend, so that the POST code 108 tests and initializes the GPU 17, the LCD 19, and the VRAM 21 upon resume. The CPU 11 starts the execution of the POST code 108 from a predetermined position, according to the pre-switch state set in the MCH 13.

In block 221, the POST code 108 sets the SMI register 14 in the MCH 13 to assert the SMI, in order to authenticate the HDD password. Upon receiving a SMI signal, the CPU 11 stores contexts in the SSM 117, and sends a SMIACK signal to the MCH 13 to notify that the CPU 11 operates in SMM. The SMI handler 113 recognizes the cause of the SMI by referencing the SMI register 14, and executes the authentication code 115.

As described in block 217, while the computer 10 operates in the OS environment, there is a possibility that the vector table 105 and the video BIOS 107 are rewritten by the malicious program. The authentication code 115 needs to call the video BIOS 107 in order to display a password request prompt on the LCD 19. However, to protect the SMM privilege, it is necessary to maintain the security of the video BIOS 107 and the vector address for calling the video BIOS 107 before calling the video BIOS 107.

In block 223, the authentication code 115 verifies whether or not the vector address corresponding to the interrupt type of INT 10h in the vector table 105 matches the vector address upon booting stored in the SMRAM area 103 in block 211. When they do not match, the authentication code 115 rewrites the vector address with the stored vector address. Alternatively, while omitting the verification of whether or not the vector addresses match, the stored vector address corresponding to the interrupt type of INT 10h may be written in the vector table 105 each time. The authentication code 115 also stores the pre-rewrite vector address in the SMRAM area 103. The authentication code 115 further computes a hash value of the video BIOS 107.

In block 225, the authentication code 115 compares the hash value computed in block 223 with the reference hash value stored in the SMRAM area 103 in block 211, to determine whether or not they match. When determining that the hash values do not match in block 225, the authentication code 115 goes to block 227 to stop the execution of the INT 10h instruction. As a result, the prompt for HDD password authentication is not displayed on the LCD 19, and the secondary HDD 26 is not recognized by the computer 10. After this, in block 243, the authentication code 115 executes the RSM instruction to switch the CPU 11 to protected mode, sets the contexts stored in the SSM 117 to the CPU 11 to execute the POST code 108, and completes resume from suspend.

When determining that the hash values match in block 225, since the video BIOS 107 has not been changed from when the reference hash value is stored, the authentication code 115 can verify the legitimacy of the video BIOS 107, and also ensure that a correct entry point of the video BIOS 107 is called when executing the INT 10h instruction. However, the authentication code 115 has not yet verified the legitimacy of the system BIOS 109 which the video BIOS 107 calls by the INT 15h instruction, and so does not execute the INT 10h instruction at this point.

The authentication code 115 knows an address where the IRET instruction code 111 of the system BIOS 109 is written in the main memory 15, beforehand. There is the case where the address of the IRET instruction code of the system BIOS 109 in the main memory 15 is changed by a legitimate program or a malicious program during loading into the main memory 15. In block 229, the authentication code 115 checks whether or not the IRET instruction code 111 is actually present in the known address of the main memory 15 where the IRET instruction code 111 is written.

When determining that the IRET instruction 111 is present in the known address in block 231, the authentication code 115 goes to block 235. When determining that the IRET instruction code 111 is not present in the known address in block 231, the authentication code 115 goes to block 233 to write the IRET instruction code 111 to the known address. Moreover, when the vector address corresponding to the interrupt type of INT 15h in the vector table 105 is not the known address of the IRET instruction code 111, the authentication code 115 rewrites the vector table 105 so that the vector address is the known address, and then goes to block 235. Even when a jump instruction is embedded in the known address of the IRET instruction 111 by the malicious program or the vector address corresponding to the interrupt type of INT 15h is hooked at an entry point of malicious code, the vector address of INT 15h is changed to be the address of the IRET instruction code 111 by the legitimate authentication code 115 at this stage.

Since the authentication code 115 only needs to rewrite the vector address 105 and/or the IRET instruction 111 so that the address of the IRET instruction code 111 becomes the entry point when the video BIOS 107 executes the INT 15h instruction, the authentication code 115 may write an arbitrary vector address and IRET instruction code 111 selected by the authentication code 115 itself. Moreover, upon rewriting the vector address and/or the IRET instruction code 111, the authentication code 115 stores the pre-rewrite contents in the SMRAM area 103. According to this procedure, though it is impossible to verify whether or not the system BIOS 109 is contaminated by the malicious program, it is ensured by the authentication code 115 that only the IRET instruction 111 is executed when the video BIOS 107 executes the INT 15h instruction. This prevents the SMM privilege from being governed by the malicious program as a result of the execution of the INT 15h instruction. FIG. 5C shows this state.

In block 235, the authentication code 115 executes the INT 10h instruction to call the video BIOS 107, in order to display a prompt necessary for HDD password authentication on the LCD 19. When doing so, the authentication code 115 pushes a value of a FLAG register, a value of a CS register, and a value of an IP register in the CPU 11 at this point, onto a stack segment secured in the main memory 15. The authentication code 115 then sets an offset value and a segment value stored in the address shown by the interrupt type of INT 10h in the vector table 105, in the IP register and the CS register in the CPU 11. As a result, the CPU 11 executes the video BIOS 107.

There is the case where the video BIOS 107 obtains setting information or unique information of the system from the system BIOS 109 during a prompt display process. For example, the GPU 17 needs to be reset upon resume from suspend. In order to obtain setting information of the system from the system BIOS 109, the video BIOS 107 executes the INT 15h instruction to call the system BIOS 109. The video BIOS 107 pushes a value of the FLAG register, a value of the CS register, and a value of the IP register in the CPU 11 at this point, onto the stack segment in the main memory 15. The video BIOS 107 then sets an offset value and a segment value stored in the address shown by INT 15h in the vector table 105, in the IP register and the CS register in the CPU 11.

Since the vector address corresponding to the interrupt type of INT 15h is set to be the address of the IRET instruction code 111 in blocks 229 to 233, the IRET instruction 111 is executed in block 237. When the IRET instruction 111 is executed, the value of the FLAG register, the value of the CS register, and the value of the IP register pushed onto the stack segment are popped, and the CPU 11 restarts the execution of the video BIOS 107 without executing substantial instruction code of the system BIOS 109.

In this way, even when the system BIOS 109 or the vector table 105 is rewritten by the malicious program, the influence of the malicious program can be eliminated in the process of executing the video BIOS 107. Here, the video BIOS 107 cannot receive predetermined information from the system BIOS 109 despite executing the INT 15h instruction. However, when the video BIOS 107 needs to receive information held by the system BIOS 109, the video BIOS 107 can use a default value held beforehand. The default value mentioned here also means minimum information needed by the video BIOS 107 in SMM.

This embodiment is applicable only when the video BIOS 107 can respond to the request from the authentication code 115 even though the system BIOS 109 called from the video BIOS 107 does not execute instruction code to be executed when the original entry point is designated. The request from the authentication code 115 referred to here is a request when operating in SMM. When operating in protected mode, the video BIOS 107 or the system BIOS 109 needs to be executed from the original entry point if any of the programs executes the INT 10h instruction or the INT 15h instruction.

In block 239, the video BIOS 107 executes the IRET instruction 111 to transfer the control of the CPU 11 to the authentication code 115, and the authentication code 115 restores the rewritten vector address corresponding to the interrupt type of INT 10h stored in the SMRAM area 103 in block 223, and also restores the rewritten IRET instruction code 111 and/or vector address corresponding to the interrupt type of INT 15h stored in the SMRAM area 103 in block 233. FIG. 5D shows the state of the main memory 15 at this point.

For example, when the user changes a primary display from an internal display to an external display while the OS is in operation and corresponding setting information is held by the system BIOS 109, if the video BIOS 107 uses a default value as setting information in block 237, a prompt may not be able to be displayed on the external display. When setting needs to be made so that the prompt is displayed on the external display, the authentication code 115 executes the INT 10h instruction again to execute the video BIOS 107 in block 241. The INT 10h instruction executed here is a limited instruction such as selecting the display for displaying the prompt, so that the video BIOS 107 refrains from calling the system BIOS 109 or rewrites the IRET instruction or the vector address as in block 233. The video BIOS 107 sets a function for selecting the display for displaying the prompt in a register of the CPU 11, and executes the INT 10h instruction.

In block 243, when the authentication code 115 executes the RSM instruction to negate the SMI and returns the contexts of the CPU 11 stored in the SSM 117 to the CPU 11, the CPU 11 restarts, in protected mode, the operation immediately before switching to SMM in block 221. The CPU 11 operates in SMM during a period from when the SMI is asserted in block 221 to when the SMI is negated in block 243. Even when the video BIOS 107 loaded in the general area 101, which has a possibility of being contaminated by the malicious program in protected mode where the OS operates, is executed during this period, the legitimacy and security of the video BIOS 107 are ensured by the authentication code 115, so that the problem of SMM privilege loss does not occur. In block 243, the video BIOS 107 may be executed by the OS or an application in protected mode where the OS operates. In such a case, though there is a possibility that the video BIOS 107 or the system BIOS 109 is contaminated by the malicious program as shown in FIG. 5D, the video BIOS 107 or the system BIOS 109 is executed in protected mode in the OS operating environment, and therefore the SMM privilege is kept from being governed by the malicious program. In block 245, when any of the programs asserts the SMI for another reason and the video BIOS 107 needs to be called during operation in SMM, the procedure goes to block 221.

There is another SMM privilege protection method whereby a reference hash value is computed not only for the video BIOS 107 but also for the system BIOS 109 and a hash value of the system BIOS 109 computed each time the video BIOS 107 is called is compared with the reference hash value. However, since the hash value of the system BIOS 109 needs to be computed including not only code running only upon booting but also code running for runtime services provided during OS operation, the computation takes time. According to the present invention, on the other hand, overhead for ensuring security when calling the system BIOS 109 by the INT 15h instruction can be suppressed.

Moreover, there is the case when, during OS operation, the system BIOS 109 stores system setting information in its storage area of the main memory. When this occurs, it is impossible to verify legitimacy using the hash value as in the case of the video BIOS 107. Hence, the SMM privilege protection by the IRET instruction is effective.

In the above-mentioned procedure, when the video BIOS 107 executes the INT 15h instruction, only the IRET instruction 111 of the system BIOS 109 is executed to return the control of the CPU 11 to the video BIOS 107. However, the present invention is not limited to the case of executing only the IRET instruction. For example, the authentication code 115 may write a jump instruction in the entry point of the vector address written by the authentication code 115 itself so that the system BIOS 109 executes the IRET instruction without executing substantial instruction code to return the control to the video BIOS 107.

Given that the video BIOS 107 does not require the services of the system BIOS 109 in order to respond to the request from the authentication code 115, there may be a method whereby the code of the video BIOS 107 is generated so as not to execute the INT 15h instruction when the authentication code 115 executes the INT 10h instruction. However, when the INT 10h instruction is executed from another program running in protected mode, the video BIOS 107 needs to execute the INT 15h instruction to use the services of the system BIOS 109. Since the video BIOS 107 is unable to recognize whether the INT 10h instruction is executed in SMM or protected mode, it is difficult to realize this method.

In the present invention, the code loaded in the area other than the SMRAM area and called during operation in SMM is not limited to the video BIOS but may be code controlling another device controller. For example, the present invention is also applicable when the SMM code calls code of an option ROM controlling a disk controller and the code of the option ROM calls the system BIOS. Moreover, though the IRET instruction is instruction code in an assembler language that is executed when an interrupt routine returns to an original routine, other instruction code that achieves the same function may be used when BIOS code is generated in another language.

As has been described, the present invention provides a method and apparatus for protecting a privilege level of system management mode of a computer system.

It is also important to note that although the present invention has been described in the context of a fully functional computer, those skilled in the art will appreciate that the mechanisms of the present invention are capable of being distributed as a computer program product in a variety of computer-readable storage medium such as CD ROMs.

While the invention has been particularly shown and described with reference to a preferred embodiment, it will be understood by those skilled in the art that various changes in form and detail may be made therein without departing from the spirit and scope of the invention.

What is claimed is:

1. A method comprising:
    loading a system management mode (SMM) program into a special memory (SMRAM) area within a system memory of a computer, and loading a first program, a second program, and a vector table into a general area of said system memory;
    determining a reference hash value of said first program by said SMM program before booting of said computer has been completed, and storing said reference hash value in said SMRAM area;
    determining a hash value of said first program by said SMM program;
    comparing said hash value with said reference hash value, after said computer has been operating under an operating environment of an operating system; and
    calling said first program by said SMM program when said hash value matches said reference hash value.

2. The method of claim 1, wherein said method further includes
    storing by said SMM program a vector address corresponding to an interrupt type for calling said first program into said SMRAM area, wherein said vector address is obtained from said vector table before said operating system operates; and
    rewriting by said SMM program said vector address corresponding to said interrupt type for calling said first program, with said vector address stored in said SMRAM area, before said calling said first program by said SMM program.

3. The method of claim 2, wherein said method further includes
    returning said rewritten vector address corresponding to said interrupt type for calling said first program to said vector table, after said calling said first program by said SMM program.

4. The method of claim 2, wherein said method further includes
    rewriting by said SMM program at least one vector address corresponding to an interrupt type for calling said second program and instruction code to return to said first program so that, when said first program executes an instruction to call said second program in said SMM, said second program executes instruction code to return to said first program without executing substantial instruction code; and
    calling said second program by said first program in said SMM, after said rewriting at least one of the vector address and said instruction code.

5. The method of claim 4, wherein said instruction code to return to said first program is an IRET instruction code.

6. The method of claim 4, wherein said method further includes
    returning said rewritten at least one vector address corresponding to said interrupt type for calling said second program and said instruction code to return to said first program to a pre-rewrite state, after said calling said second program.

7. The method of claim 1, wherein said SMM program is a program for performing password authentication, said first program is a video BIOS for controlling a video chip, and said second program is a system BIOS for providing system information.

8. The method of claim 1, wherein said comparing and said calling are performed in a period during which said computer resumes from a suspend state.

9. A computer comprising:
    a processor capable of operating in a system management mode (SMM);
    a chipset for asserting a system management interrupt (SMI) to cause said processor to operate in said SMM; and
    a main memory having a SMRAM area in which a SMM program is loaded, and a general area in which a first program, a second program, and a vector table are loaded, wherein said SMM program causes said computer to compute a reference hash value of said first program in a period during which said chipset asserts said SMI, and after said computer has been operating under an operating environment of an operating system, compute a hash value of said first program, compare said computed hash value to said reference hash value, and call said first program in said SMM when said hash value matches said reference hash value.

10. The computer of claim 9, wherein said SMM program causes said computer to store a vector address corresponding to an interrupt type for calling said first program into said SMRAM area, said vector address being obtained from said vector table before said operating system operates; and before calling said first program, organize said vector table so that said first program is called when said vector address stored in said SMRAM area is used to call said first program.

11. The computer of claim 10, wherein said SMM program causes said computer to rewrite at least one of said second program and a vector address so as to return to said first program without substantially executing said second program when said first program calls said second program in said SMM mode.

12. The computer of claim 11, wherein said first program is a video BIOS called from said SMM program by an INT 10h instruction, said second program is a system BIOS called from said video BIOS by an INT 15h instruction, and said code of said second program is IRET instruction code.

13. The computer of claim 12, wherein said chipset asserts said SMI when said computer resumes from a suspend mode.

* * * * *